United States Patent [19]
Yang

[11] Patent Number: 6,160,320
[45] Date of Patent: Dec. 12, 2000

[54] LOAD CONTROL METHOD BY DETECTING THE TIME STATE OF SAME FREQUENCY ALTERNATING CURRENT SINE WAVE AND ALTERNATING CURRENT SQUARE WAVE

[76] Inventor: Chung-Chin Yang, 9-1F., No. 186, Ta Tun 19 Street, Taichung, Taiwan

[21] Appl. No.: 09/366,677

[22] Filed: Aug. 4, 1999

[51] Int. Cl.$^7$ ............................... H02J 1/10; H02J 3/38
[52] U.S. Cl. ............................................. 307/52; 323/237
[58] Field of Search ................................. 307/35, 41, 42, 307/52, 57; 323/235, 237, 239, 241, 319

[56] References Cited

U.S. PATENT DOCUMENTS

| | | | |
|---|---|---|---|
| 2,806,963 | 9/1957 | Woll | 307/52 |
| 4,100,426 | 7/1978 | Baranowski et al. | 307/41 |
| 5,994,883 | 11/1999 | Liu | 323/237 |

*Primary Examiner*—Stephen W. Jackson
*Assistant Examiner*—Andre Henry
*Attorney, Agent, or Firm*—Varndell & Varndell, PLLC

[57] ABSTRACT

A method of controlling the load in an electric circuit by means of detecting the time state of same frequency of alternating current sine wave and alternating current square wave, which includes the step of picking up a half cycle wave signal, then attenuating the picked up half cycle wave signal and shaping the signal into a pulse wave signal, the step of chopping the picked up half cycle wave signal and shaping the signal into a square wave signal and then delayed the square wave signal, the step of comparing the rising edge of the square wave signal with the descending edge of the pulse signal so as to obtain a time difference, and the step of controlling the load of the electric circuit by means of a first control mode if the voltage level of the time difference thus obtained is at low potential, or by means of a second control mode if the voltage level of the time difference thus obtained is at high potential.

6 Claims, 2 Drawing Sheets

LOAD CONTROL METHOD BY DETECTING THE TIME STATE OF SAME FREQUENCY ALTERNATING CURRENT SINE WAVE AND ALTERNATING CURRENT SQUARE WAVE

BACKGROUND AND SUMMARY OF THE INVENTION

The present invention relates to method of controlling the load in an electric circuit, and more particularly to such a load control method which controls the load by means of detecting the time state of same frequency alternating current sine wave and alternating current square wave.

In certain electric systems, an interruption of power supply may cause a big loss. In order to eliminate this problem from an electric system, an unceasing power system or uninterrupted power supply shall be installed. Further, regular emergency fixtures have self-provided battery power supply. When city power supply fails, the self-provided battery power supply is automatically started to turn on the load. In order to obtain sufficient illumination in a big space, a big number of emergency fixtures shall be used. It is not economic to install a big number of emergency fixtures in a space.

The present invention has been accomplished under the circumstances in view. It is the main object of the present invention to provide a load control method, which controls the load of an electric system object to the condition of provided power supply between city power supply and unceasing power system power supply. It is another object of the present invention to provide a load control method, which imperatively drives the load to work upon a failure of city power supply. According to the present invention, the method of controlling the load in an electric system is achieved by means of detecting the time state of same frequency of alternating current sine wave and alternating current square wave. The method includes the step of picking up a half cycle wave signal, then attenuating the picked up half cycle wave signal and shaping the signal into a pulse wave signal, the step of chopping the picked up half cycle wave signal and shaping the signal into a square wave signal and then delayed the square wave signal, the step of comparing the rising edge of the square wave signal with the descending edge of the pulse signal so as to obtain a time difference, and the step of controlling the load of the electric circuit by means of a first control mode if the voltage level of the time difference thus obtained is at low potential, or by means of a second control mode if the voltage level of the time difference thus obtained is at high potential.

DETAILED DESCRIPTION OF THE PREFERRED EMBODIMENT

Figure 1:
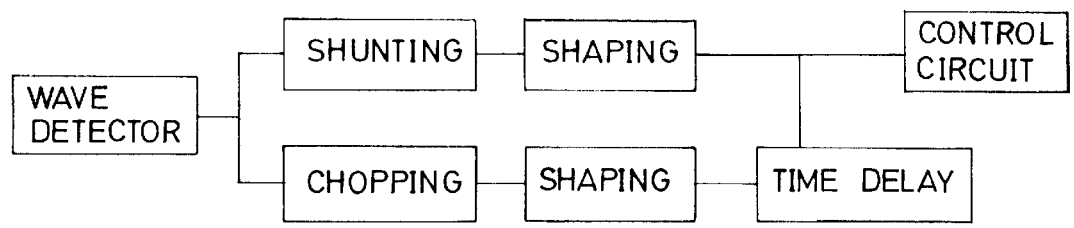
FIG. 1 is a block diagram showing the operation flow of the present invention.

Referring to FIG. 1, the invention relates to a method of controlling the load in an electric circuit by means of detecting the time state of same frequency of alternating current sine wave, namely, city power supply, and alternating current square wave, namely, unceasing power system. The load control method comprises the steps of:

1. picking up a positive half cycle wave signal from the waveform of the electric circuit;
2. shunting the half cycle wave signal thus obtained from step 1, enabling the electric potential of the half cycle wave signal to be attenuated to a predetermined intensity;
3. shaping the attenuated sine wave signal thus obtained from step 2 into a pulse wave, where a square wave pulse signal is obtained if the attenuated signal from step 2 is a square wave signal;
4. chopping the positive half cycle wave signal picked up from step 1;
5. shaping the chopped signal obtained from step 4 into square wave signal;
6. delaying the time series of the wave signal obtained from step 4, then comparing the rising edge of the wave signal thus obtained with the rising edge of the wave signal obtained from step 3, so as to obtain a time difference;
7. controlling the load of the circuit by means of a first control mode if the voltage level of the time difference thus obtained from stp 6 is low, or by means of a second control mode if the voltage level of the time difference thus obtained from step 6 is high According to an alternate form of the present invention, the load control method comprises the steps of:

1. picking up a negative half cycle wave signal from the wave form of the electric circuit;
2. shunting the half cycle wave signal thus obtained from step 1, enabling the electric potential of the half cycle wave signal to be attenuated to a predetermined intensity;
3. shaping the attenuated sine wave signal thus obtained from step 2 into a pulse wave, where a square wave pulse signal is obtained if the attenuated signal from step 2 is a square wave signal;
4. chopping the positive half cycle wave signal picked up from step 1;
5. shaping the chopping signal obtained from step 4 into square wave signal;
6. delaying the time series of the wave signal obtained from step 4, then comparing the descending edge of the wave signal thus obtained with the descending edge of the wave signal obtained from step 3, so as to obtain a time difference;
7. controlling the load of the circuit by means of a first control mode if the voltage level of the time difference thus obtained from step 6 is Low, or by means of a second control mode if the voltage level of the time difference thus obtained from step 6 is High.

Figure 2:
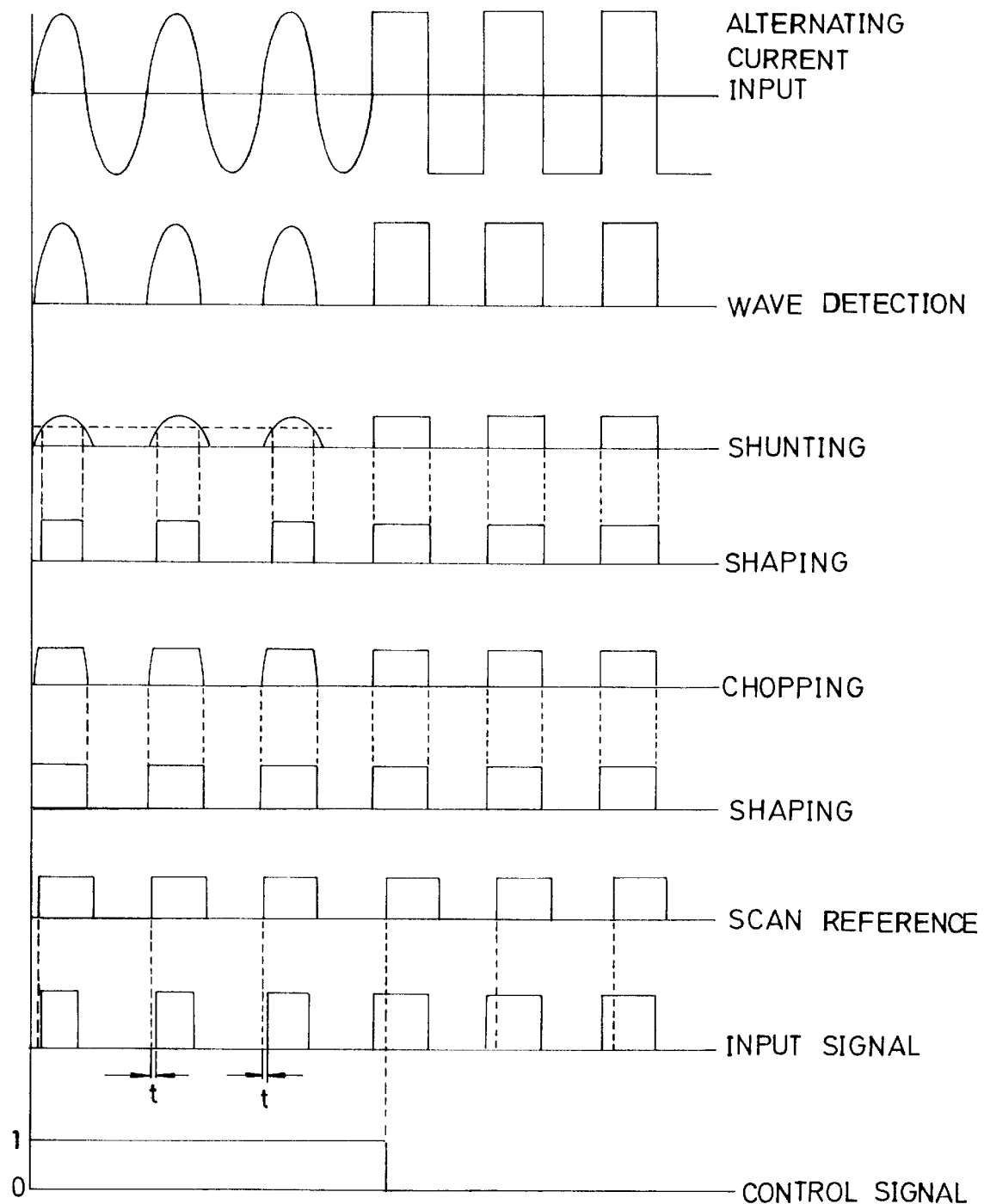
FIG. 2 is a time series chart according to the present invention.

Referring to FIG. 2 and FIG. 1 again, when the supply of city power supply is normal, the waveform in the circuit, namely, the sine wave of city power supply is as shown in the left half part in FIG. 2. A positive (negative) half cycle wave signal is picked up from the sine wave, then shunted and shaped into a pulse signal. The positive (negative) half cycle wave signal is also chopped and shaped into a square wave signal, and then the time series of the squre wave signal, and then the time series of the square wave signal thus obtained is delayed. The delayed square wave signal is then compared with the aforesaid pulse signal, so as to obtain a time difference (t) of high potential, and therefore a corresponding control signal (1) is thus obtained to drive the circuit, causing the circuit to work under a first control mode, that is, enabling the circuit to be controlled by the power switch to turn on/off the load. When the supply of city power supply fails, the unceasing power system in the circuit is driven to output power supply by means of square wave, at this time, the waveform in the circuit, namely, the square wave is detected, and a positive (negative) half cycle wave signal is also chopped and shaped into a square wave signal (see the right half part shown in FIG. 2), and then the time series of the square wave signal thus obtained is delayed. The delayed square wave signal is then compared with the aforesaid square wave pulse signal, so as to botain a time difference (t) of low potential, and therefore a corresponding control signal (0) is thus obtained to drive the circuit, causing the circuit to work under a second control mode, that is, enabling the load to be imperatively turned on, and released from the constraint of the power switch of the circuit.

As indicated above, the present invention enables normal electric loads to be used as emergency loads during a failure of city power supply. According to the present invention, electric loads can be selected from an electric system to form an emergency system for working during a failure of city power supply.

What is claimed is:

1. A method of controlling the load in an electric circuit by means of detecting the time state of same frequency of alternating current sine wave and alternating current square wave, the method comprising the steps of:
    i) picking up a half cycle wave signal from the waveform of the electric circuit;
    ii) shunting the half cycle wave signal thus obtained from step i), enabling the electric potential of the half cycle wave signal to be attenuated to a Predetermined intensity;
    iii) shaping the attenuated sine wave signal thus obtained from step ii) into a pulse wave, where a square wave pulse signal is obtained if the attenuated signal from step ii) is a square wave signal;
    iv) chopping the positive half cycle wave signal picked up from step i);
    v) shaping the chopped signal obtained from step iv) into square wave signal;
    vi) delaying the time series of the wave signal obtained from step iv), then comparing the rising edge of the wave signal thus obtained with the rising edge of the wave signal obtained from step iii), so as to botain a time difference;
    vii) controlling the load of the circuit by means of a first control mode if the voltage level of the time difference thus obtained from step vi) is at low potential, or by menas of a second control mode if the voltage level of the time difference thus obtained from step vi) is at high potential.

2. The method of claim 1 wherein the first step of picking up a half cycle wave signal from the waveform of the electric circuit is to pick up the positive half cycle wave signal.

3. The method of claim 1 wherein said first control mode is controlled through a power switch at the electric circuit, and said second control mode is drive the load without the constraint of the power switch of the electric circuit.

4. A method of controlling the load in an electric circuit by means of detecting the time state of same frequency of alternating current sine wave and alternating current square wave, the method comprising the step of:
    i) picking up a half cycle signal from the waveform of the electric circuit;
    ii) shunting the half cycle wave signal thus obtained from step i), enabling the electric potential of the half cycle wave signal to be attenuated to a predetermined intensity;
    iii) shaping the attenuated sine wave signal thus obtained from step ii) into a pulse wave, where a square wave pulse signal is obtained if the attenuated signal from step ii) is a square wave signal;
    iv) chopping the positive half cycle wave signal picked up from step i);
    v) shaping the chopped signal obtained from step iv) into square wave signal;
    vi) delaying the time series of the wave signal obtained from iv), then comparing the descending edge of the wave signal thus obtained with the descending edge of the wave signal obtained from step iii), so as to obtain a time difference;
    vii) controlling the load of the circuit by means of a first control mode if the ovltage level of the time difference thus obtained from step vi) at low potential, or by means of a second control mode if te voltage level of the time difference thus obtained from step vi) is at high potential.

5. The method of claim 4 wherein the first step of picking up a half cycle wave signal from the waveform of the electric circuit is to pick up the negative half cycle wave signal.

6. The method of claim 4 wherein said first control mode is controlled through a power switch at the electric circuit, and said second control mode is drive the load without the constraint of the power switch of the electric circuit.

* * * * *